(12) United States Patent
Jacobi et al.

(10) Patent No.: US 7,987,384 B2
(45) Date of Patent: Jul. 26, 2011

(54) METHOD, SYSTEM, AND COMPUTER PROGRAM PRODUCT FOR HANDLING ERRORS IN A CACHE WITHOUT PROCESSOR CORE RECOVERY

(75) Inventors: Christian Jacobi, Schoenaich (DE); Matthias Pflanz, Holzgerlingen (DE); Chung-Lung Kevin Shum, Wappingers Falls, NY (US); Hans-Werner Tast, Shoenbuch (DE); Aaron Tsai, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 12/029,516

(22) Filed: Feb. 12, 2008

(65) Prior Publication Data

US 2009/0204766 A1 Aug. 13, 2009

(51) Int. Cl.
G06F 11/00 (2006.01)
(52) U.S. Cl. .......................... 714/6.24; 714/805
(58) Field of Classification Search ................ 714/6, 52, 714/803, 805, 6.24, 49
See application file for complete search history.

(56) References Cited

U.S. PATENT DOCUMENTS

| | | | |
|---|---|---|---|
| 4,852,100 A | 7/1989 | Christensen et al. | |
| 5,544,341 A | 8/1996 | Nakagawa et al. | |
| 5,732,209 A | 3/1998 | Vigil et al. | |
| 5,784,391 A | 7/1998 | Konigsburg | |
| 5,784,394 A | 7/1998 | Alvarez, II et al. | |
| 5,883,904 A | 3/1999 | Arimilli et al. | |
| 6,332,181 B1 | 12/2001 | Bossen et al. | |
| 6,460,122 B1 | 10/2002 | Otterness et al. | |
| 6,507,928 B1 | 1/2003 | Richardson | |
| 6,543,028 B1 * | 4/2003 | Jamil et al. | 714/800 |
| 6,802,039 B1 | 10/2004 | Quach et al. | |
| 7,035,986 B2 * | 4/2006 | Check et al. | 711/168 |
| 7,043,679 B1 * | 5/2006 | Keltcher et al. | 714/763 |

(Continued)

FOREIGN PATENT DOCUMENTS

JP 63278162 11/1988

OTHER PUBLICATIONS z/Architecture, Principles of Operation, Sixth Edition, Apr. 2007, Publication No. SA22-7832-05, copyright IBM Corp. 1990-2007, pp. 1-1218.

*Primary Examiner* — Robert Beausoliel
*Assistant Examiner* — Elmira Mehrmanesh
(74) *Attorney, Agent, or Firm* — Cantor Colburn LLP; John Campbell

(57) ABSTRACT

A method for handling errors in a cache memory without processor core recovery includes receiving a fetch request for data from a processor and simultaneously transmitting fetched data and a parity matching the parity of the fetched data to the processor. The fetched data is received from a higher-level cache into a low level cache of the processor. Upon determining that the fetched data failed an error check indicating that the fetched data is corrupted, the method includes requesting an execution pipeline to discontinue processing and flush its contents, and initiating a clean up sequence, which includes sending an invalidation request to the low level cache causing the low level cache to remove lines associated with the corrupted data, and requesting the execution pipeline to restart. The execution pipeline accesses a copy of the requested data from a higher-level storage location.

30 Claims, 3 Drawing Sheets

U.S. PATENT DOCUMENTS

| | | | |
|---|---|---|---|
| 7,100,096 B2* | 8/2006 | Webb et al. | 714/52 |
| 7,734,949 B2* | 6/2010 | Koktan et al. | 714/5 |
| 7,752,505 B2* | 7/2010 | Gschwind et al. | 714/52 |
| 2005/0188249 A1 | 8/2005 | Hart et al. | |
| 2005/0229075 A1* | 10/2005 | Berkmann et al. | 714/758 |
| 2007/0044003 A1 | 2/2007 | Doweck et al. | |
| 2007/0079184 A1* | 4/2007 | Weiss et al. | 714/718 |
| 2007/0234101 A1* | 10/2007 | Koktan et al. | 714/2 |
| 2009/0006803 A1* | 1/2009 | Luick | 711/202 |
| 2009/0193308 A1* | 7/2009 | Habermann et al. | 714/746 |
| 2009/0282308 A1* | 11/2009 | Gutsche et al. | 714/746 |

* cited by examiner

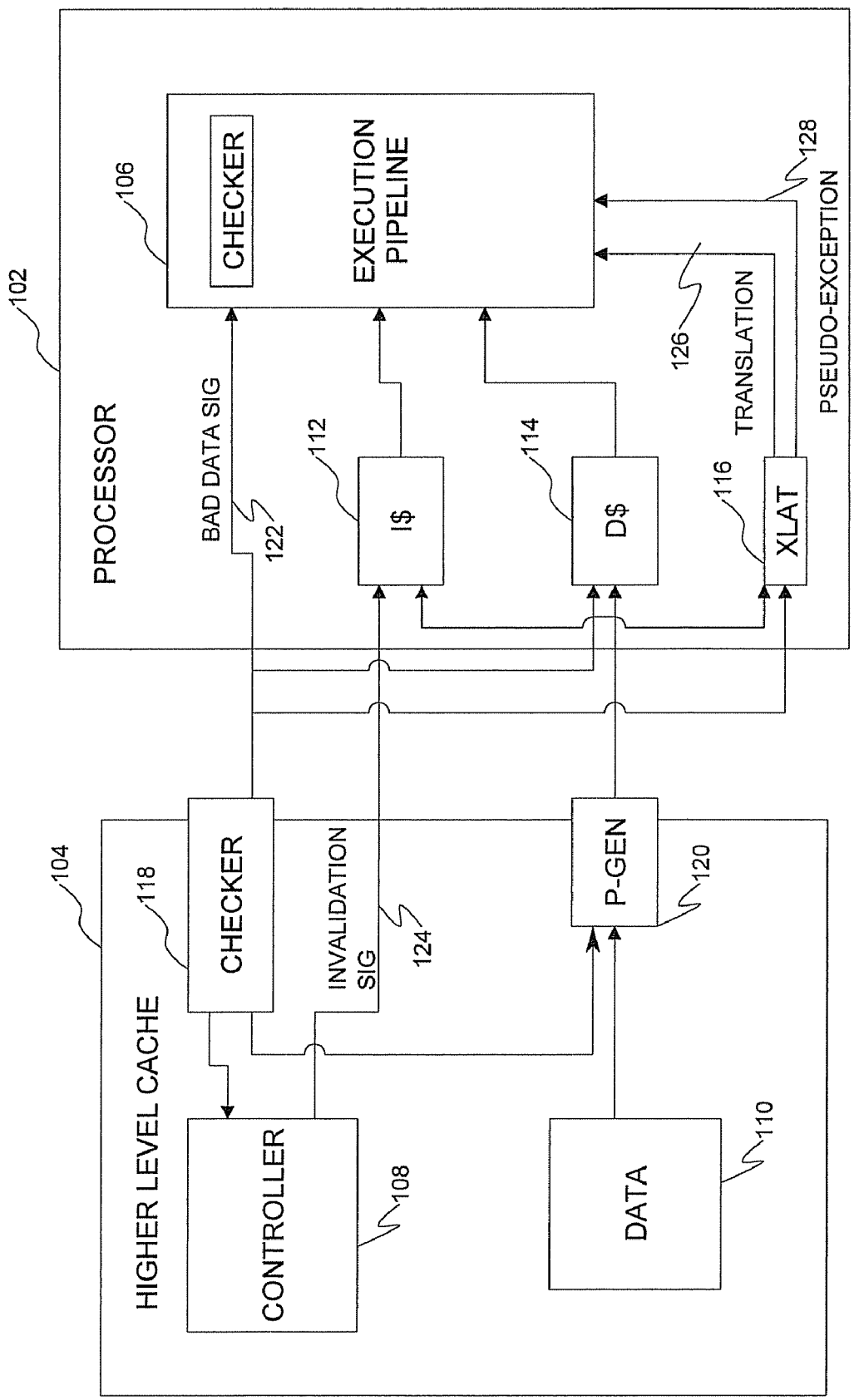

METHOD, SYSTEM, AND COMPUTER PROGRAM PRODUCT FOR HANDLING ERRORS IN A CACHE WITHOUT PROCESSOR CORE RECOVERY

BACKGROUND OF THE INVENTION

The present disclosure relates generally to error handling in a cache memory and, in particular, to a method, system, and computer program product for handling errors in a cache memory without processor core recovery.

In a microprocessor system, the data stored in caches is protected from consumption using various techniques during bit-flips, e.g., errors caused by cosmic rays or alpha particles. Techniques used to detect and correct bit error have evolved into an elaborate science over the past several decades. Perhaps the most basic detection technique is the generation of odd or even parity where the number of 1's or 0's in a data word is "exclusive or-ed" (XOR-ed) together to produce a parity bit. For example, a data word with an even number of 1's will have a parity bit of 0 and a data word with an odd number of 1's will have a parity bit of 1, with this parity bit data appended to the stored memory data. If there is a single error present in the data word during a read operation, it can be detected by regenerating parity from the data and then checking to see that it matches the stored (originally generated) parity.

It was soon discovered that this parity technique could be extended to not only detect errors, but correct errors by appending an XOR field, an error correction code (ECC) field, to each code word. The ECC field is a combination of different bits in the word XOR-ed together so that errors (small changes to the data word) can be easily detected, pinpointed and corrected.

These error detection and error correction techniques are commonly used to restore data to its original/correct form in noisy communication transmission media or for storage media where there is a finite probability of data errors due to the physical characteristics of the device. The memory devices generally store data as voltage levels representing a 1 or a 0 in RAM and are subject to both device failure and state changes due to high-energy cosmic rays and alpha particles. Similarly, hard disk drives that store 1's and 0's as magnetic fields on a magnetic surface are also subject to imperfections in the magnetic media and other mechanisms that can cause changes in the data pattern from what was originally stored.

When data or instructions are read out of a cache, it is checked to determine whether it is corrupted. If a corruption is detected, the underlying processor should not use the corrupt data, and the corrupt data should be removed from the cache and replaced by good data before the processor continues processing.

In typical machines, if a parity error in a level 1 (L1) cache has been detected in the processor, the processor would go through recovery operations. This may entail signaling the processor to flush the execution pipeline (thereby preventing the corrupt data from being used), followed by resetting all states in the processor to initial states (e.g., FSMs, cache contents, queue contents, etc.). In particular, all cache entries are removed including the corrupt entry. Going through recovery sometimes leads to the termination of the software program currently running on the processor.

If a parity or ECC uncorrectable error was detected in a L2 cache line, the processor that fetched the line would go through recovery in a similar manner as that described above with respect to the L1 cache, and while the processor is recovering, the L2 cache would remove that particular line. These recovery operations result in increased latency of the system, as the error correction activities must be employed before the processor is able to continue on with its tasks. It would be desirable to provide a means to handle these errors (e.g., parity or ECC) in a cache without performing a processor core recovery operation.

BRIEF SUMMARY OF THE INVENTION

Embodiments of the invention include a method for handling errors in a cache without processor core recovery. The method includes receiving a fetch request for data from a processor and simultaneously transmitting fetched data and a parity matching the parity of the fetched data to the processor. The fetched data is retrieved from a higher level cache in response to the fetch request and received into a low level cache of the processor. Upon determining that the fetched data failed an error check indicating that the fetched data is corrupted, the method includes requesting an execution pipeline of the processor to discontinue processing and flush its contents, and initiating a clean up sequence. The clean up sequence includes sending an invalidation request to the low level cache causing the low level cache to remove lines associated with the corrupted data, and requesting the execution pipeline to restart. The request to the execution pipeline to restart causes the execution pipeline to access a higher-level storage location to receive a copy of the requested data.

Additional embodiments include a system and computer program product for handling errors in a cache without processor core recovery.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 is a block diagram depicting a processor core used in implementing error handling in accordance with an exemplary embodiment.

Figure 2A:
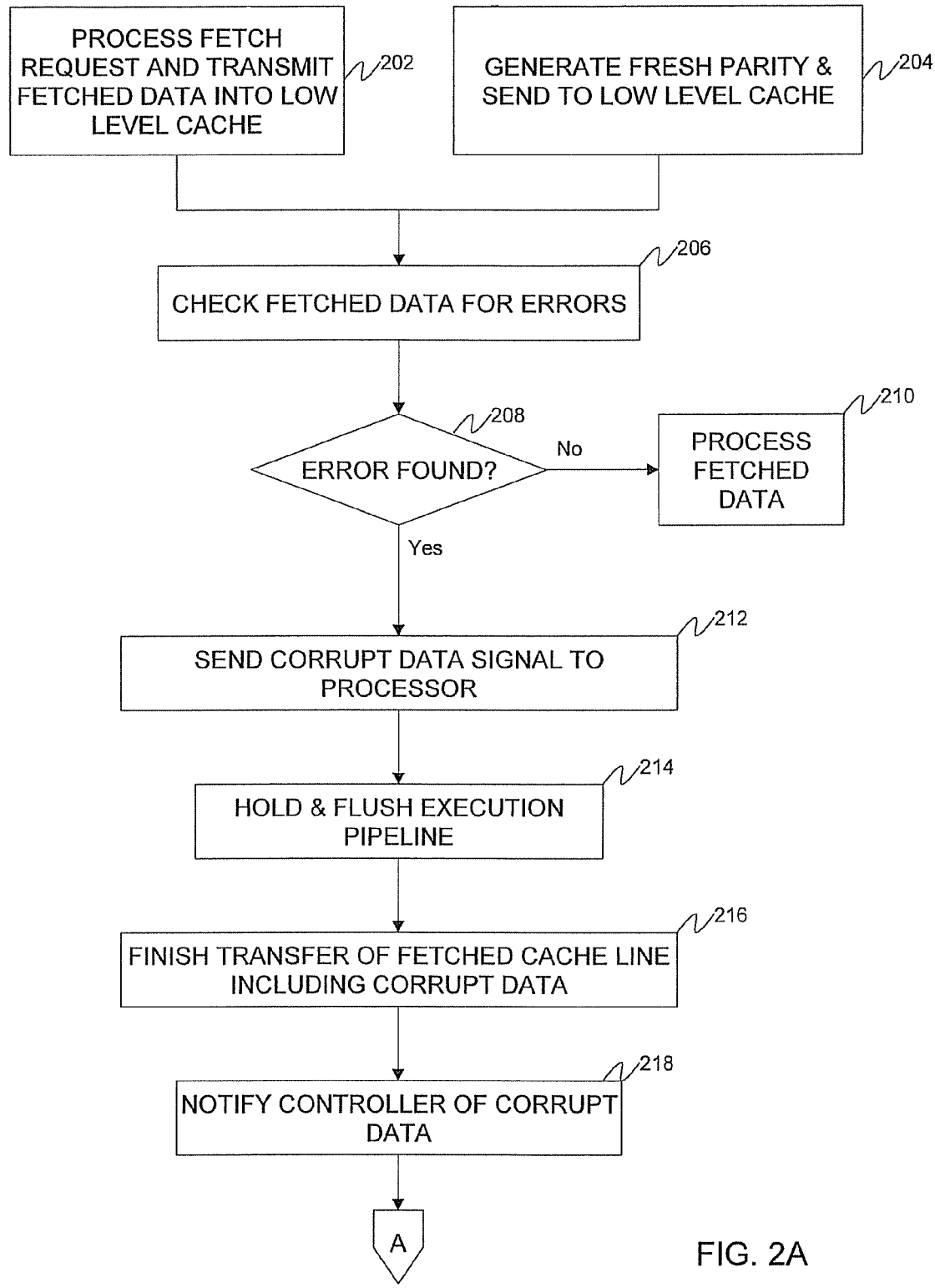
FIGS. 2A-2B are flow diagrams describing a process for implementing error handling in accordance with an exemplary embodiment.

The detailed description explains the preferred embodiments of the invention, together with advantages and features, by way of example with reference to the drawings.

DETAILED DESCRIPTION OF THE INVENTION

In accordance with exemplary embodiments, an error handling system is provided. The error handling system enables clean up of corrupted data in a processor core by flushing a corresponding execution pipeline of the processor core, and issuing invalidations into the processor core by a higher-level cache. The invalidations may be repeated if they are initially rejected due to pending stores in the processor caches. Once the clean up is completed, the execution pipeline is released and continues normal processing, without any software interruption.

Turning now to FIG. 1, a block diagram depicting a system for handling errors in a cache will now be described in accordance with an exemplary embodiment. The diagram of FIG. 1 includes a processor core of a microprocessing system. The processor core includes a processor 102, which in turn, includes an execution pipeline 106 and low-level cache(s), e.g., L1-I-Cache 112 and L1-D-Cache 114 (simplified as I$ for 'instruction' and D$ for 'data', respectively), and a higher-level unified cache 104 (referred to as L2). The processor 102 may also include a translation unit 116 that performs address translation (virtual to absolute translation).

It will be understood that the processor 102 may employ multiple functional units to support pipelining of instructions in processing circuitry. For example, the functional units may include an instruction fetch unit, instruction decode unit, and execution units, to name a few. The execution pipeline 106 may increase instruction execution throughput by performing stages such as fetching, decoding, execution and completion in parallel for multiple instructions in a sequence.

The L2 cache 104 stores data 110 and fetches the data 110 for transfer to the processor 102 upon request. The L2 cache 104 also includes an L2 control 108 (also referred to herein as "controller"). In an exemplary embodiment, the L2 control 108 may be a memory controller and includes logic for performing the error handling system processes described herein. As used herein, the term "logic" refers to hardware circuitry and/or software instructions for performing one or more functions.

The L1 and L2 caches may comprise high-speed memory systems positioned between the processor 102 and main storage (not shown), to hold recently accessed main storage data. As in conventional hierarchically organized memory systems, whenever data in storage is requested, it is first determined whether or not the data is in the cache (L1 and/or L2) and, if so, it is accessed from the respective cache location. If the data is not in the cache, then the data is obtained from the main storage (not shown) and stored in the cache, usually replacing other data which had been previously stored in the cache memory.

It will be understood that multiple levels of cache may exist between the processor 102 and main storage. As one gets farther away from the processor 102, each of the caches may become larger, slower, and less expensive. The caches closest to the processor 102 are referred to as the L1 caches 112, 114, the next-closest cache is referred to as the L2 cache 104, and so on.

As shown in FIG. 1 for illustrative purposes, one processor (e.g., processor 102) may have multiple L1 caches, such as one L1 cache for data/operands (e.g., L1 cache 114) and one L1 cache for instructions (e.g., L1 cache 112).

Also, as shown in FIG. 1 for illustrative purposes, one L2 cache (e.g., L2 cache 104) may be connected to multiple L1 caches (e.g., L1 caches 112, 114), where the L1 caches are either for the same processor (e.g., the processor 102 as shown in FIG. 1), or for multiple processors (not shown) in a multi-processor system.

In a virtual memory system, a memory access issued by an instruction is usually a virtual address known to an associated program. A real address (or absolute/physical address) in main memory associated with a virtual address may be determined through a translation process. The translation process may employ a multi-cycle, multi-step process that involves table lookups to get the real address and is known to those familiar in the art. The translation process is performed by the translation unit 116.

To speed up translations, a translation look-aside buffer or table (not shown) may be used, which holds the virtual address and corresponding real address for recent translations. The portion of an address that is subject to translation is referred to as a page. A cache may include a corresponding directory array (not shown), which holds the addresses of the data currently residing in the cache. Each entry in the directory corresponds to a unit of storage called a line. When a fetch request is sent from the processor 102 to the L1 cache 112, 114, the fetch's address may be compared against the directory to see if the corresponding data is in the cache. If data is not in the cache, the cache line containing it will be requested from higher level caches (or main memory).

The error handling system of the invention provides a means to clean up corrupted data without employing processor recovery operations. The error handling system allows the bypassing of corrupted data into a processor (e.g., processor 102) without going through the additional latency of ECC correction. When an error is detected, the corrupt data clean up mechanism of the error handling system prevents usage of the corrupted data in the processor 102, and during this cleanup phase, a higher-level cache (e.g., L2 cache 104) may use ECC correction methods (e.g., via a checker 118 and/or a checker 119 within the associated processor) to correct the corrupt data, instead of completely removing it from the higher-level cache. The checker 118 and/or checker 119 within the processor 102 may employ, e.g., parity or ECC codes.

Figure 2B:
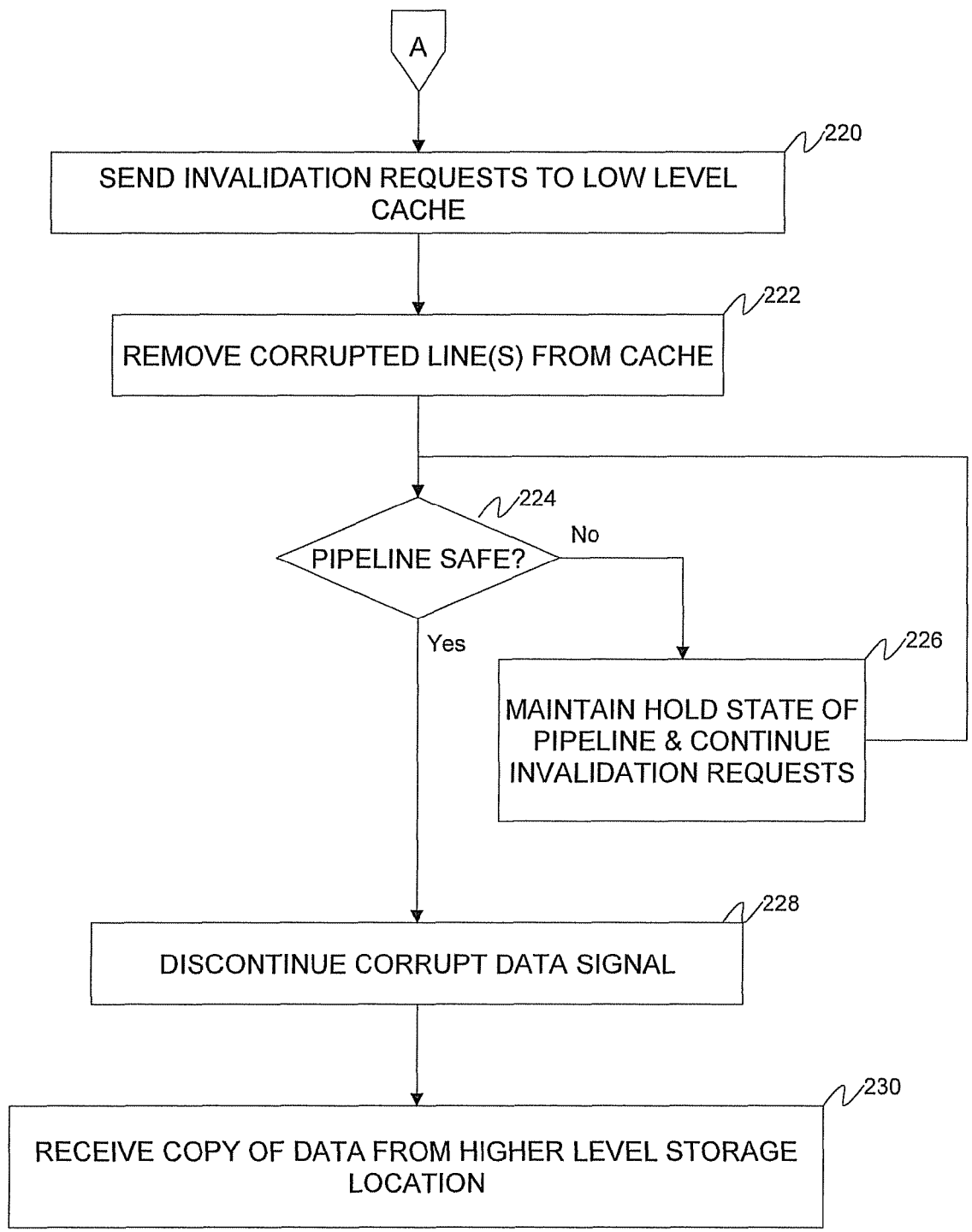

Turning now to FIGS. 2A-2B, flow diagrams describing a process for implementing error handling in a cache will now be described in an exemplary embodiment. The process described in FIGS. 2A-2B assumes that the higher-level cache is an L2 cache. However, it will be understood that other caches may be used in implementing the error handling system, e.g., a L3 cache in a hierarchical storage system.

The L2 cache 104 processes a fetch-request from one of the L1 caches 112 and 114, fetches the data (e.g., data 110 in L2 cache 104), and transmits the fetched data to the processor 102 and into the corresponding L1 caches 112 or 114 at step 202. In order to prevent any checkers inside the processor 102 (e.g., checker 119), which checks the data coming from the L2 or L1 cache into the execution pipeline 106, from initiating a recovery if the data 110 is corrupted, the L2 cache 104 simultaneously generates a fresh parity 120, so that the parity 120 is matching the parity of the fetched data 110 even if the fetched data 110 is corrupted, and sends the parity 120 to the L1 caches 112, 114 at step 204.

As indicated above, the data 110 read out of the L2 cache 104 is intercepted by checker 118 and is checked for any errors (e.g., parity errors or ECC codes) at step 206. If no data corruption is detected at step 208, the processor 102 processes the data 110 in a conventional manner at step 210. However, if such a data corruption is detected at step 208, the L2 cache 104 sends a 'corrupt-data' signal 122 into the processor 102 via the checker 118, indicating that the previously transferred data was corrupt (corrupted) at step 212. The signal to the processor 102 initiates a 'corrupt data cleanup' sequence as will now be described. The 'corrupt data' signal to the processor 102 causes the processor 102 to hold (i.e., discontinue processing) and flush its execution pipeline 106 at step 214, which prevents any instructions that might have used the corrupted data from finishing. The corrupt data includes, but is not limited to, corrupt instruction text or corrupt operand data. The corrupted data may be defined as incorrect data (e.g., corrupted by bit flipping due to, for example, an alpha particle).

The L2 cache 104 then finishes the transfer of the fetched cache line (including the corrupt data) at step 216. The L2-internal control 108 is notified of the corrupt data at step 218 and the process proceeds to FIG. 2B. As soon as the data transfer is done, invalidation requests (invalidation signals) 124 are sent by the L2 cache 104 into the L1 caches 112, 114 at step 220. From the L1 cache perspective, these invalidation requests 124 may be treated the same as conventional multiprocessor invalidations since the processor 102 already supports these types of requests for supporting cache coherency protocols. Based on these invalidations, the L1 caches 112, 114 remove the corrupted lines from their caches at step 222. Invalidation processes are known by those skilled in the art, whereby one level of cache receives invalidations from a higher-level cache and forwards the invalidations to a lower-level cache. The exemplary embodiment of the invention enables the L2 cache 104 to create and send its own invalidations to the L1 cache.

In the L2 cache 104, if cross-invalidations are received from the next higher-level cache, the L2 cache 104 looks up its directory for whether to forward the cross-invalidations to the L1 caches 112, 114. The error handling system enables the L2 cache 104 to generate its own invalidation requests from the L2 cache 104 to the L1 cache 112, 114 and itself, in order to remove the corrupted data out of the L2 cache and L1 cache.

At step 224, it is determined whether the execution pipeline 106 is safe to proceed. The execution pipeline 106 processing hold is maintained in this state at step 226 until the L2 cache 104 indicates that it is safe to proceed. The L2 cache 104 makes this determination in response to sending the invalidations of the corrupt data, and the L1 cache 112, 114 accepting the invalidation requests. As soon as all of the invalidations have been successfully performed (e.g., the invalidation requests are not rejected by the L1 caches, due to, e.g., pending data stores), the corrupt data is no longer in the L1 or L2 caches, thereby rendering it safe for the L2 cache 104 to let the processor 102 restart.

As soon as all invalidations for the corrupt lines have been processed, the L2 cache 104 discontinues the 'corrupt-data' signal 122 at step 228, thereby allowing the processor execution pipeline 106 to restart, and the corrupt data clean up sequence is complete. The execution pipeline 106 then accesses the requested data from the next higher-level of cache hierarchy, or from memory (not shown) at step 230 (since the lines of the corrupted data in the L1 and L2 caches have been removed) and receives a good copy (e.g., previously saved and before corruption) of the requested data.

As shown in FIG. 1, a translation unit (xlat) 116 is capable of translating 126 virtual to absolute addresses. For this purpose, the translation unit 116 can also fetch data (also referred to as 'translation table entries'), e.g., data 110 from the L2 cache 104. When there is corrupt data in the L2 cache 104 (e.g., a corrupt translation table), the translation unit 116 is notified, and then issues a pseudo exception signal 128, as if it had encountered an invalid translation table entry. As a result, the translation process 126 is aborted for the virtual address, and the corrupt translation table and translation result are discarded. The processor pipeline 106 gets flushed and held, and the instruction which required the translation is repeated after the L2 cache 104 has removed the corrupt data.

In an alternative embodiment, the translation unit 116 may not be directly connected to the L2 cache 104, but may instead be connected to the I$ or D$ caches 112, 114 for obtaining data 110 from the L2 cache 104.

If the type of error code (parity or ECC) in the cache allows for corrupt data detection and correction, the error handling system allows the bypassing of corrupt data into the processor 102 without going through the additional latency of ECC-correction. When an ECC error is detected, the above-described corrupt data clean up mechanism may prevent usage of the corrupt data in the processor 102, and during this clean up phase, the L2 cache 104 may use ECC correction to correct the data, instead of completely removing it from the L2 cache 104. In this manner, the L2 cache 104 can deliver its data to the processor without paying the latency penalty that would otherwise be needed for the in-line ECC-correction. In this manner, the ECC correction latency (which could be of multiple cycles) is only observed when there is a corrupted data detected, and will not impact performance. That is, the ECC-code would still give a protection on more than 1 bit flip, which is better than simple parity.

While the process in FIG. 2 is described in reference to the processor 102 of FIG. 1, it will be understood that the process can be applied to any processing circuitry that incorporates data parity. For example, the process may be applied to other digital designs, such as an application specific integrated circuit (ASIC), a programmable logic device (PLD), or other such digital devices capable of processing instructions. Therefore, the processor 102 of FIG. 1 can represent a variety of digital designs that incorporate processing circuitry.

Technical effects and benefits include enhancing error detection and recovery in processing circuitry. The error handling system allows the bypassing of ECC protected data from a cache into a processor without going through the additional latency of ECC-correction. When an ECC error is detected, a corrupt data clean up mechanism is initiated to prevent usage of the corrupt data in the processor, and during this clean up phase, a higher-level cache corrects the data, instead of completely removing it from the higher-level cache. In this manner, the ECC correction latency (which could be of multiple cycles) is only observed when there is a corrupted data detected, and will not impact performance. That is, the ECC-code would still give a protection on more than 1 bit flip, which is better than simple parity As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for handling errors in a cache memory without processor core recovery, comprising:
receiving a fetch request for data from a processor;
simultaneously transmitting fetched data and a parity matching the parity of the fetched data to the processor, the fetched data retrieved from a higher-level cache in response to the fetch request and received into a low level cache of the processor, wherein the parity matching the parity of the fetched data prevents the processor from initiating a recovery operation;
upon determining that the fetched data failed an error check, the failure indicating the fetched data is corrupted:
requesting an execution pipeline of the processor to discontinue processing and flush its contents via a signal; and
initiating a clean up sequence, comprising:
sending invalidation requests to the low level cache causing the low level cache to remove lines associated with the corrupted data; and
requesting the execution pipeline to restart;
wherein requesting the execution pipeline to restart causes the execution pipeline to access a copy of the requested data from a higher-level storage location.

2. The method of claim 1, wherein the corrupted data includes at least one of:
incorrect instruction text; and
incorrect operand data.

3. The method of claim 1, wherein the clean up sequence further includes:
notifying a controller of the higher-level cache that provided the fetched data of the results of the error check; and
completing transfer of the fetched data to the processor prior to sending the invalidation request.

4. The method of claim 3, further comprising:
multiplexing the invalidation request on the same control and address bus that is used for sending multi-processor invalidations to the low level cache.

5. The method of claim 1, wherein the error check includes at least one of:
a parity check;
an error code detection; and
an error code correction;
wherein the higher-level storage location removes or corrects the corrupted data.

6. The method of claim 1, further comprising:
restarting the processor in response to determining that all invalidation requests have been successfully completed, indicating the corrupted data has been removed from the execution pipeline and low level cache, the restart initiated by discontinuing the signal.

7. The method of claim 1, further comprising:
continuing the signal to the processor when the invalidation is rejected due to pending stores in the processor, the method further comprising:
repeating each of the invalidation requests until each of the invalidation requests is accepted by the processor.

8. The method of claim 1, wherein the fetch request further includes an instruction for translating a virtual address, the method further comprising:
notifying a translation unit of the processor of a corrupt translation table that failed error check, the notification causing the translation unit to issue a pseudo-exception signal to the execution pipeline, the pseudo-exception signal operable for aborting a translation process for the virtual address;
discarding the translation table and result from the execution pipeline; and
repeating the instruction that requested the translation of the virtual address.

9. The method of claim 1, wherein, in response to determining the fetched data failed the error check, the higher-level cache performs:
invalidating its cache lines associated with the corrupted data.

10. The method of claim 1, wherein, in response to determining the fetched data failed the error check, the higher-level cache performs:
reinstalling ECC-corrected data into itself.

11. A system for handling errors in a cache memory without processor core recovery, comprising:
a processor core including a processor, execution pipeline, and low level cache; and
a higher-level cache including a controller and data stored in the higher-level cache, the higher-level cache performing a method, comprising:
receiving a fetch request for data from the processor;
simultaneously transmitting fetched data and a parity matching the parity of the fetched data to the processor, the fetched data retrieved from the higher-level cache in response to the fetch request and received into the low level cache of the processor, wherein the parity matching the parity of the fetched data prevents the processor from initiating a recovery operation;
upon determining that the fetched data failed an error check, the failure indicating the fetched data is corrupted:
requesting the execution pipeline of the processor to discontinue processing and flush its contents via a signal; and
initiating a clean up sequence, comprising:
sending invalidation requests to the low level cache causing the low level cache to remove lines associated with the corrupted data; and
requesting the execution pipeline to restart;
wherein requesting the execution pipeline to restart causes the execution pipeline to access a copy of the requested data from a higher-level storage location, the higher-level storage system in communication with the processor core.

12. The system of claim 11, wherein the corrupted data includes at least one of:
incorrect instruction text; and
incorrect operand data.

13. The system of claim 11, wherein the clean up sequence further includes:
notifying a controller of the higher-level cache that provided the fetched data of the results of the error check; and
completing transfer of the fetched data to the processor prior to sending the invalidation request.

14. The system of claim 13, wherein the higher-level cache further performs:
multiplexing the invalidation requests on the same control and address bus that is used for sending multi-processor invalidations to the low level cache.

15. The system of claim 11, wherein the error check includes at least one of:
a parity check;
an error code detection; and
an error code correction;
wherein the higher-level storage location removes or corrects the corrupted data.

16. The system of claim 11, wherein the higher-level cache further performs:
restarting the processor in response to determining that all invalidation requests have been successfully completed, indicating the corrupted data has been removed from the execution pipeline and low level cache, the restart initiated by discontinuing the signal.

17. The system of claim 11, wherein the higher-level cache further performs:
continuing the signal to the processor when the invalidation is rejected due to pending stores in the processor, the method further comprising:
repeating each of the invalidation requests until each of the invalidation requests is accepted by the processor.

18. The system of claim 11, wherein the fetch request further includes an instruction for translating a virtual address, the method further comprising:
notifying a translation unit of the processor of a corrupt translation table that failed error check, the notification causing the translation unit to issue a pseudo-exception signal to the execution pipeline, the pseudo-exception signal operable for aborting a translation process for the virtual address;
discarding the translation table and result of the translation from the execution pipeline; and
repeating the instruction that requested the translation of the virtual address.

19. The system of claim 11, wherein, in response to determining the fetched data failed the error check, the higher-level cache performs:
invalidating its cache lines associated with the corrupted data.

20. The system of claim 11, wherein, in response to determining the fetched data failed the error check, the higher-level cache performs:
reinstalling ECC-corrected data into itself.

21. A computer program product for handling errors in a cache memory without processor core recovery, the computer program product comprising:
a storage medium readable by a processing circuit and storing instructions for execution by the processing circuit for implementing a method, the method comprising:
receiving a fetch request for data from a processor;
simultaneously transmitting fetched data and a parity matching the parity of the fetched data to the processor, the fetched data retrieved from a higher-level cache in response to the fetch request and received into a low level cache of the processor, wherein the parity matching the parity of the fetched data prevents the processor from initiating a recovery operation;
upon determining that the fetched data failed an error check, the failure indicating the fetched data is corrupted:
requesting an execution pipeline of the processor to discontinue processing and flush its contents via a signal; and
initiating a clean up sequence, comprising:
sending invalidation requests to the low level cache causing the low level cache to remove lines associated with the corrupted data; and
requesting the execution pipeline to restart;
wherein requesting the execution pipeline to restart causes the execution pipeline to access a copy of the requested data from a higher-level storage location.

22. The computer program product of claim 21, wherein the corrupted data includes at least one of:
incorrect instruction text; and
incorrect operand data.

23. The computer program product of claim 21, wherein the clean up sequence further includes:
notifying a controller of the higher-level cache that provided the fetched data of the results of the error check; and
completing transfer of the fetched data to the processor prior to sending the invalidation request.

24. The computer program product of claim 23, further comprising instructions for:
multiplexing the invalidation requests on the same control and address bus that is used for sending multi-processor invalidations to the low level cache.

25. The computer program product of claim 21, wherein the error check includes at least one of:
a parity check;
an error code detection; and
an error code correction;
wherein the higher-level storage location removes or corrects the corrupted data.

26. The computer program product of claim 21, further comprising instructions for implementing:
restarting the processor in response to determining that all invalidation requests have been successfully completed, indicating the corrupted data has been removed from the execution pipeline and the low level cache, the restart initiated by discontinuing the signal.

27. The computer program product of claim 21, further comprising instructions for implementing:
continuing the signal to the processor when the invalidation is rejected due to pending stores in the processor; and
repeating each of the invalidation requests until each of the invalidation requests is accepted by the processor.

28. The computer program product of claim 21, wherein the fetch request further includes an instruction for translating a virtual address, the method further comprising:
notifying a translation unit of the processor of a corrupt translation table that failed error check, the notification causing the translation unit to issue a pseudo-exception signal to the execution pipeline, the pseudo-exception signal operable for aborting a translation process for the virtual address;
discarding the translation table and result of the translation from the execution pipeline; and
repeating the instruction that requested the translation of the virtual address.

29. The computer program product of claim 21, wherein, in response to determining the fetched data failed the error check, the higher-level cache performs:
invalidating its cache lines associated with the corrupted data.

30. The computer program product of claim 21, wherein, in response to determining the fetched data failed the error check, the higher-level cache performs:
reinstalling ECC-corrected data into itself.

* * * * *